United States Patent
Hu et al.

(10) Patent No.: US 11,054,303 B2
(45) Date of Patent: Jul. 6, 2021

(54) UNI-DIRECTIONAL SIGNAL TRANSMIT METHOD USING DISTRIBUTED FIBER SENSING

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/783,108

(22) Filed: Feb. 5, 2020

(65) Prior Publication Data
US 2020/0249078 A1 Aug. 6, 2020

Related U.S. Application Data

(60) Provisional application No. 62/801,679, filed on Feb. 6, 2019.

(51) Int. Cl.
*G01N 21/00* (2006.01)
*G01H 9/00* (2006.01)
*G01D 5/353* (2006.01)

(52) U.S. Cl.
CPC ......... *G01H 9/006* (2013.01); *G01D 5/35361* (2013.01)

(58) Field of Classification Search
CPC .......... G01M 11/3145; G01M 11/335; G01M 11/33; G01M 11/3109; G01M 11/338
USPC ....................................................... 356/73.1
See application file for complete search history.

(56) References Cited

U.S. PATENT DOCUMENTS

2013/0094011 A1* 4/2013 Barry ...................... G01L 1/246 356/4.01
2014/0326860 A1* 11/2014 Choi .................. G01D 5/35335 250/227.11

* cited by examiner

*Primary Examiner* — Md M Rahman
(74) *Attorney, Agent, or Firm* — Joseph Kolodka

(57) ABSTRACT

Disclosed are improved distributed optical fiber sensing systems, methods, and structures employing disparate point sensors that utilize uni-directional signal transmission via the distributed optical fiber such that a separate communications network for the disparate point sensors is not required.

10 Claims, 7 Drawing Sheets

UNI-DIRECTIONAL SIGNAL TRANSMIT METHOD USING DISTRIBUTED FIBER SENSING

CROSS REFERENCE

This disclosure claims the benefit of U.S. Provisional Patent Application Ser. No. 62/801,679 filed Feb. 6, 2019, the entire contents of which are incorporated by reference as if set forth at length herein.

TECHNICAL FIELD

This disclosure relates generally to optical communications and optical sensing systems, methods and structures. More particularly, it describes distributed optical fiber sensing systems, methods, and structures employing uni-directional signal transmit methodologies.

BACKGROUND

As is known in the optical sensing and communications arts, distributed optical fiber sensing involves several related technologies in which an interrogator—generally located within a station—actively generates optical signals, introduces them into an optical fiber, and subsequently detects reflected signals originating along a length of the fiber. Such reflections may originate—for example—as a result of changing environmental conditions that the fiber and/or sensors positioned along its length experience. As such, the optical fiber conveys—via reflected signal(s)—environmental/sensory data back to the interrogator where—using signal processing techniques—the interrogator determines/derives valuable information about environmental conditions along the length of the fiber.

As currently implemented, distributed fiber sensing configurations are generally application specific in that one kind or type of sensor detects a single parameter type. The addition of other, different type(s) of sensors oftentimes requires additional communications facilities and/or methods for these different sensor types to communicate data they generate to a central office collector. Accordingly, systems, methods, and structures that facilitate the addition of different sensor types to existing distributed optical fiber sensing configurations would represent a welcome addition to the art.

SUMMARY

An advance in the art is made according to aspects of the present disclosure directed to improved distributed optical fiber sensing systems, methods, and structures employing disparate point sensors that utilize uni-directional signal transmission via the distributed optical fiber.

In sharp contrast to the prior art, the addition and employment of point sensors to distributed optical fiber sensing systems—according to the present disclosure—may advantageously be performed without the necessity for additional communications protocols and/or networks. Such point sensors—according to aspects of the present disclosure—generally provide sensory data in an electrical domain as an electrical signal—that electrical signal being subsequently modulated onto a mechanical/vibratory acoustic signal that is applied to the optical fiber sensing system. In this inventive manner, generally non-vibratory point sensors may be conveniently added to existing or planned optical fiber sensing systems thereby providing sensory data heretofore unavailable via pure optical fiber sensing methodologies. Among the sensory data that is now available according to the present disclosure includes gas and or weather sensors including gas phase volumetric measurement(s) and/or concentration measurement(s) and/or compositional measurement(s) as well as contemporary weather sensor data including barometric pressure, humidity, wind speed, etc.

Most broadly, aspects of the present disclosure provide mechanisms to utilize distributed fiber sensing to transmit information, that employs a distributed fiber sensing system using backscattered light to detect fiber vibration or strain level; a vibration or strain generator, to apply vibration or strain change to the fiber; a modulator that modulates the information to transmit into signal that drives the vibration/strain generator; wherein the modulated information transmits back to the interrogator where the backscattered light is detected. Advantageously, the distributed fiber sensing system according to the present disclosure may include an interrogator to generate an optical signal, and detect the backscattered signal, thereby detecting the vibration and/or strain level along the fiber. Additionally, the distributed fiber sensing system may advantageously employ Rayleigh backscattering, to detect vibration/strain through phase change; or through amplitude changes. Furthermore, the distributed fiber sensing system according to the present disclosure may employ Brillouin Optical Time Domain Reflectometery (BOTDR), to detect vibration fiber strain level.

Operationally, any vibration/strain generators attached—or proximate—to fiber, may be configured with acoustic/strain insulation from environment. In particular configurations, an interrogator may directly recover what is transmitted from point sensor modulator and derive sensory information by demodulation. In still additional configurations, both environmental and generator stimulated vibration/strain applied to fiber may be employed/detected and the modulator(s) may employ spread spectrum coding for interference tolerance, low signal level(s) to avoid interference to environmental vibration/strain detection.

Further operational advantages according to the present disclosure permit employing a speaker or a fiber stretcher as the vibration/strain generator. Still further, point sensors may employ multiple vibration/strain generators to transmit sensory data and such generators may be isolated from one another, or not isolated from one another and instead employ orthogonal code techniques to differentiate among them. Finally, the interrogator may be configured to completely recover an acoustic signal before sending to demodulator to recover the point sensor's information wherein the interrogator only does necessary front-end processing, and passes all necessary information to demodulator and the demodulator resamples data and tunes signal phase for best SNR Generally, and as will be appreciated by those skilled in the art, systems, methods, and structures according to the present disclosure employs distributed fiber acoustic sensor as modem. By attaching other types of sensors to the fiber link, and modulating the sensed information into acoustic frequency that the interrogator is able to detect, the attached point sensors are able to send information to the central office (or other stations) without dedicated communication/sensor network

BRIEF DESCRIPTION OF THE DRAWING

A more complete understanding of the present disclosure may be realized by reference to the accompanying drawing in which.

Figure 1:
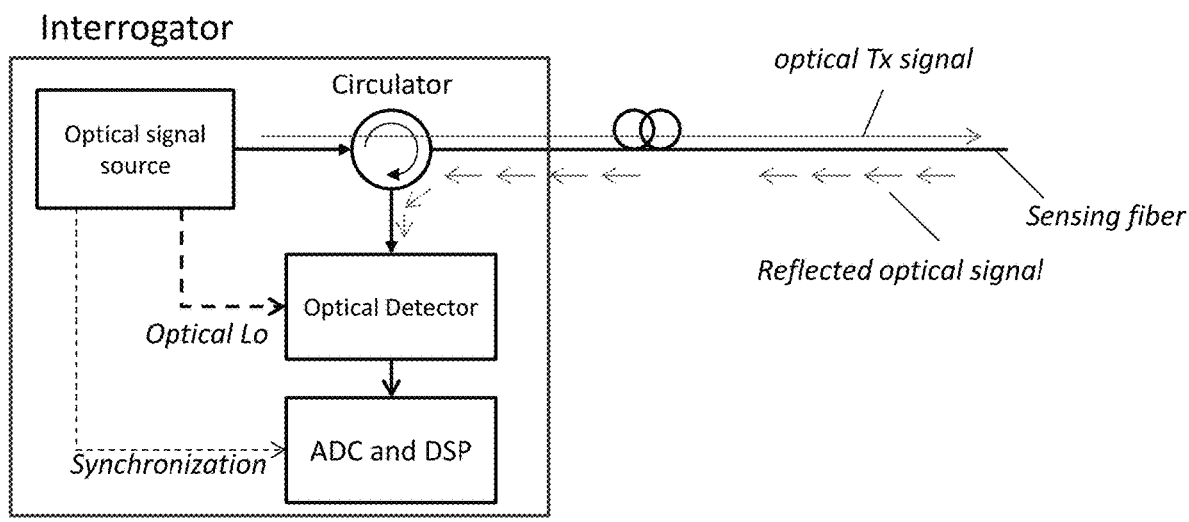
FIG. 1 shows a schematic diagram of a prior art configuration of a distributed fiber sensing arrangement.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting once more that distributed fiber sensing generally describes systems and methods that include an interrogator system—conveniently and/or centrally located inside a station—which actively generates optical signals, introduces those signals into an optical fiber, and subsequently detects reflected signals that originate along the fiber. Operationally, such fiber acts as a passive link that passes or otherwise conveys environmental information back to the interrogator via the reflected signal(s). By processing the reflected/received signal(s), the interrogator derives information about the environmental conditions along the entire fiber.

Further—and as noted previously—distributed fiber sensing is application specific, in that one kind of sensor generally can only detect a single parameter type. Such single parameter sensor types known in the art include temperature, acoustic vibration, and strength level(s), etc. To provide other sensed types, point sensors are usually employed to sense/detect/provide data and point sensors may include gas sensor(s) and/or weather (humidity, barometric pressure, moisture) etc as well as compositional sensors such as gas sensor(s).

Operationally, such point sensors generally require a communications network to send results/data back to a central receiving office, especially when the location at which the sensing occurs is geographically far away from that central office. Such necessity may result in a complicated infrastructure setup or limited sensing capability.

One example is using sensor network, either star or mesh-type, self-organized or managed, and collect the sensed data through this network. The drawback is that the sensing range is limited, comparing to the ~50 km range in distributed fiber sensing. In addition, the routing nodes cannot run in low-power mode; they must always be on to provide routing for the sensing nodes. Another example is using communication network, which is limited by existing communication infrastructure, or requires significant network construction and/or equipment cost.

In sharp contrast to contemporary systems that employ such extra communication infrastructure and methods, the present disclosure advantageously provides a method to add additional/other types of sensors along a distributed sensing fiber—while avoiding the need to establish a communication network.

Turning now to FIG. 1, there is shown a schematic diagram of a distributed fiber sensing arrangement as known in the prior art. Shown in that figure is an interrogator structure including an optical signal source that may include a laser, electrical signal generator, a modulator, and amplifier(s); a circulator that directs the source signal to a sensing fiber and the backscattered light to optical detector; a fiber link that conveys backscattered light comprising environmental information; an optical detector that may include photo diode, amplifier(s), to convert reflected optical signal to electrical domain; and an analog to digital converter (ADC) and digital signal processor (DSP) to convert detected analog signal to digital domain and perform digital signal processing to decode sensed information.

In one illustrative example, the source signal is an optical pulse, and each part of the optical fiber reflects a small portion of the optical pulse. The reflected signal includes any information that the interrogator is to sense. As shown in the figure, the optical local oscillator (Lo) is an optical signal provided from the local optical signal source that may be used for coherent detection. Additionally, a synchronization signal from the signal source is employed to determine a starting location.

Those skilled in the art will appreciate that a distributed fiber sensor is able to detect all locations passed simultaneously—up to a given spatial resolution. With this in mind—the following description focuses on one such sensing location, i.e., a segment of fiber that has a length up to the spatial resolution, unless explicitly specified.

We note that a signal resulting from Rayleigh backscattering exhibits a phase change that is linear relative to a vibration or stretch level. As such, this characteristic may be employed to detect a vibration of acoustic frequency. A fiber sensor methodology employing such vibrational/acoustic characteristic is known in the art as Distributed Acoustic Sensing (DAS). An upper limit for detecting frequency is determined by optical pulse repetition rate which in turn is limited by fiber length.

For example, a 5 km fiber limits the pulse repetition rate such that it does not exceed 20 kHz—which results in a 10 kHz upper limit of detectable acoustic frequency. Besides phase change, the Rayleigh backscattered signal can also have its instant amplitude reflecting the fiber vibration. Although the power of Rayleigh backscattering light is random, it changes slowly so the amplitude may be used to detect an instant vibration or strain change of the optical fiber. Another type of backscattering is called Brillouin Optical Time Domain Reflectometer (BOTDR), wherein backscattered light convey/carries a fiber strain level via frequency shift. By detecting the backscattered light signal's frequency shift, an interrogator is able to determine strain level at any given fiber location.

Systems, methods and structures according to aspects of the present disclosure advantageously employ the above noted characteristic to actively transmit a signal to an interrogator. Operationally—along a length of sensing fiber where a point sensor is required—such point sensor is placed proximate to—or attached to—the optical fiber such that it generates an acoustic frequency signal that conveys information back to the interrogator. As before, the interrogator extracts the acoustic signal associated with that point source location and subsequently determines point source specific information from that signal.

Of particular advantage—and according to further aspects of the present disclosure—such point sensor(s) may be of any type. For example, a weather station, gas sensor, or even imaging sensors (camera) may be employed. Operationally, and by way of illustrative example only, the point source may include a modulator that modulates "native" sensed data (i.e., temperature, wind speed, humidity, RGB data, etc), and modulate that native data into an acoustic frequency within the sensing range of the fiber employed. Note that the "native" sensed data is not one represented by mechanical vibrations—rather electrical—or even chemical—signal(s). In illustrative practice, such modulator output may drive a mechanical vibration generator that converts from—for example—electrical signal(s) to a mechanical vibration—such as a speaker or other component that subsequently mechanically/vibrationally stimulates the optical fiber. Such arrangement is shown schematically in FIG. 2.

Figure 2:
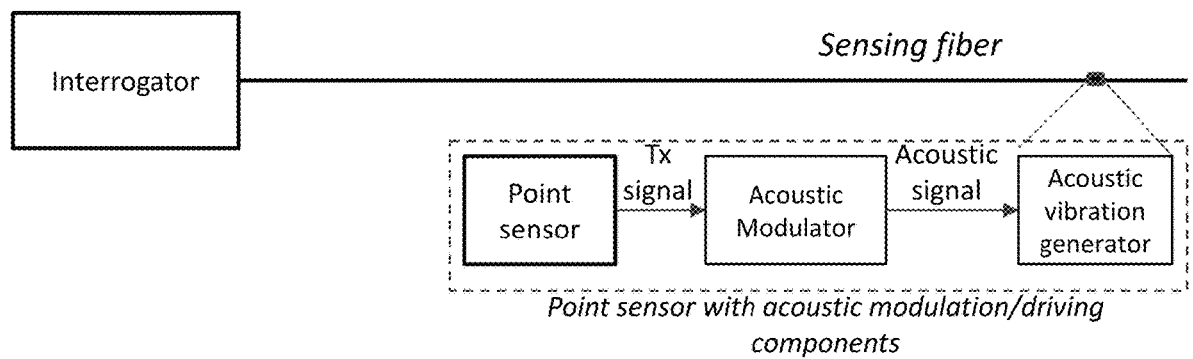
FIG. 2 shows a schematic diagram of an illustrative point sensor using modulated acoustic signal(s) to send information to an interrogator according to aspects of the present disclosure.

FIG. 2 shows a schematic diagram of an illustrative point sensor using modulated acoustic signal(s) to send information to an interrogator according to aspects of the present disclosure. As may be observed from that figure, the interrogator is in communication with a sensing fiber which in turn is vibrationally/acoustically coupled to a point sensor with acoustic modulation/driving components and positioned proximate to—or contacting—the optical fiber according to aspects of the present disclosure. Operationally, such point sensor senses the environment and produces a signal representative of its sensing. That signal is modulated by an acoustic modulator and the resulting acoustic signal is applied to vibration generator that in turn mechanically vibrates the sensing fiber. The vibrating fiber acts on interrogator light which is subsequently detected/decoded by the interrogator to derive point sensor information.

Figure 3:
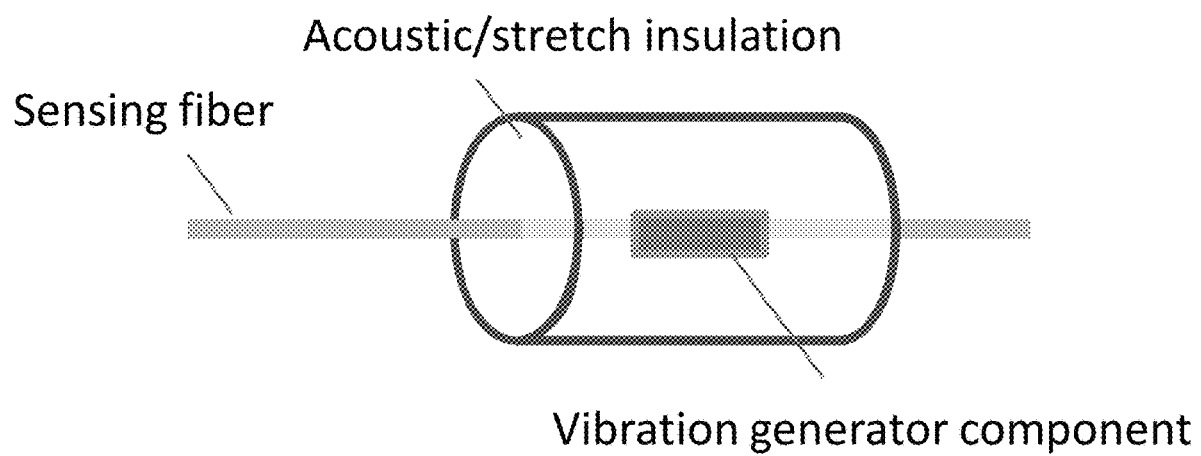
FIG. 3 is a schematic diagram of an illustrative vibration generator protected by acoustic/stretch insulator according to aspects of the present disclosure.

In one particular illustrative embodiment, the fiber segment that is stimulated by the point sensor arrangement may include acoustic insulation and anti-stretch material packaged out of the point sensor stimulation header, to avoid environmental interference. Such insulation creates un-disturbed environment for that segment of fiber so that the point sensor generated acoustic signal will have the best detected SNR at the interrogator. The modulator may use either direct binary signal modulation or multi-level modulation. Such illustrative arrangement is shown schematically in FIG. 3.

In one embodiment, the modulator uses coded modulation such as a spreading code which has strong interference tolerance. This will eliminate the need of acoustic insulation which can have simple deployment. With low-enough power, the point sensor generated signal will not cause interference to sensed environmental information, which means the point sensor can overlap with acoustic sensing and both can work at the same time.

Figure 4:
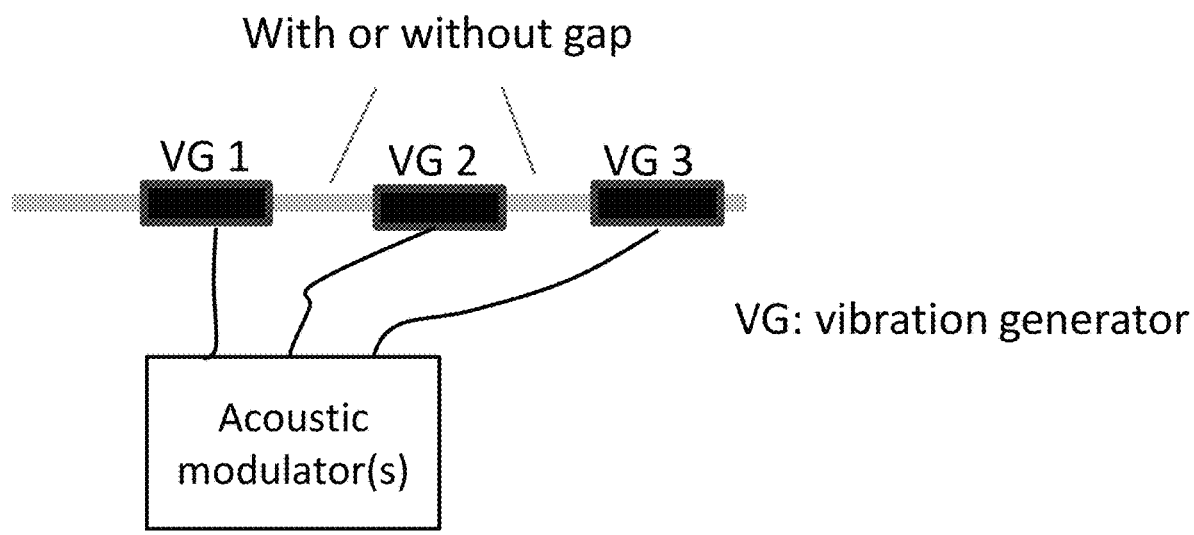
FIG. 4 is a schematic diagram of an illustrative configuration using multiple vibration generators for one point sensor to increase Tx bandwidth according to aspects of the present disclosure.

Advantageously—for increased bandwidth, the point sensor may employ multiple vibration generators, each attached to different physical segments of the fiber. FIG. 4 is a schematic diagram of an illustrative configuration using multiple vibration generators for one point sensor to increase Tx bandwidth according to aspects of the present disclosure.

With reference to that figure, it may be observed that adjacent vibration generators—each vibrationally/mechanically coupled to the optical fiber—are spaced apart relative to one another such that they do not interfere with one another. Of course, if interference is not an issue, then such individual vibration generators need not be physically separated from one another along the fiber.

Figure 5:
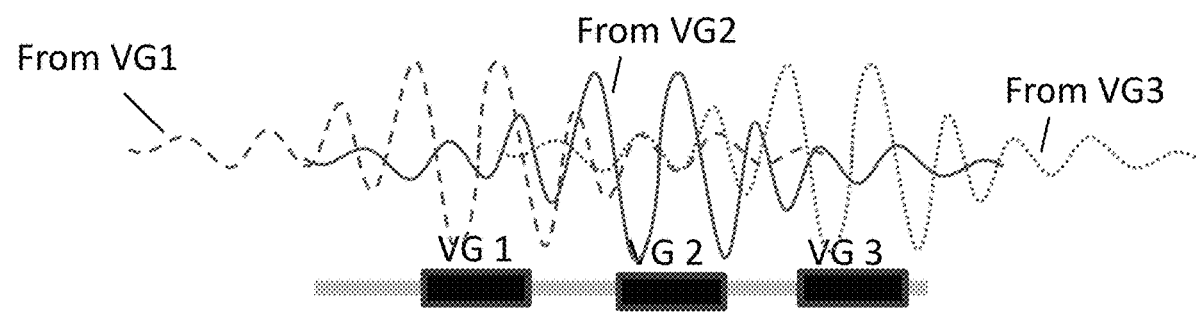
FIG. 5 is a schematic diagram of an illustrative configuration using multiple inferred vibration generators for one point sensor according to aspects of the present disclosure.

Note that in one illustrative embodiment, certain vibratory signals generated from individual ones of the multiple vibration generators are overlapped on the fiber from the different individual generators, and these generators use orthogonal codes similar to those used in CDMA (Code Division Multiple Access). FIG. 5 is a schematic diagram of an illustrative configuration using such multiple inferred vibration generators for one point sensor according to aspects of the present disclosure.

As will be readily appreciated by those skilled in the art, point sensor(s) employed in configurations according to aspects of the present disclosure, can advantageously be solar or battery powered, and work in low-power mode, and transmit signals only when needed. Demodulation logic is responsible to detect and synchronize the sequence.

Figure 6:
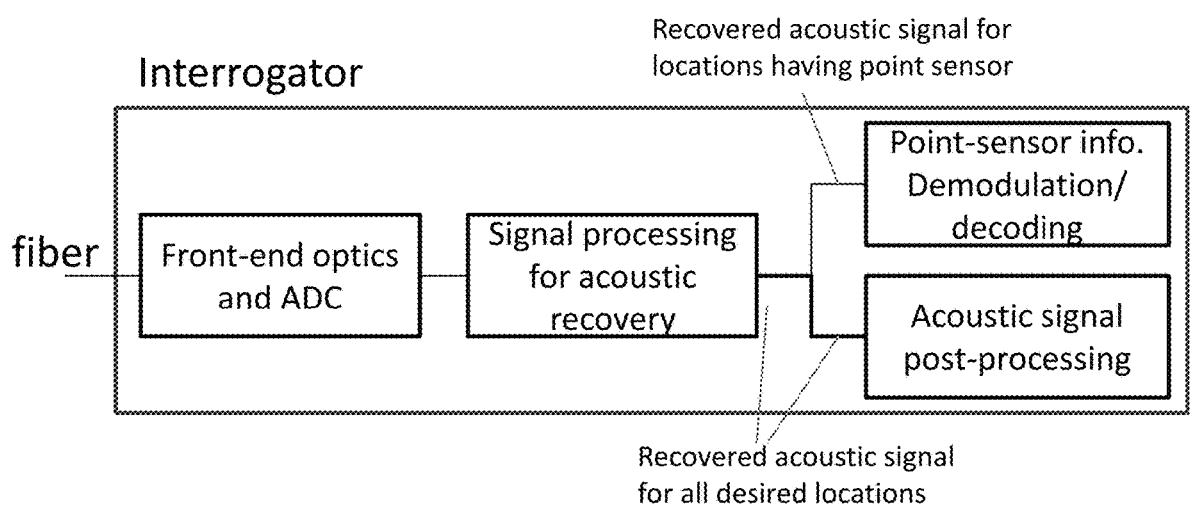
FIG. 6 is a schematic diagram of an illustrative arrangement showing demodulation/decoding from fully-recovered acoustic signal(s) according to aspects of the present disclosure.

In one illustrative embodiment, the interrogator uses same procedure as DAS processing, extracts the acoustic signal of pulse repetition frequency for the desired location, and passes the recovered acoustic signal to post-processing module to decode the information from point sensor. This operation requires the vibration generator to be located inside one fiber segment, for maximum power efficiency and/or SNR. FIG. 6 is a schematic diagram of an illustrative arrangement showing demodulation/decoding from fully-recovered acoustic signal(s) according to aspects of the present disclosure.

Figure 7:
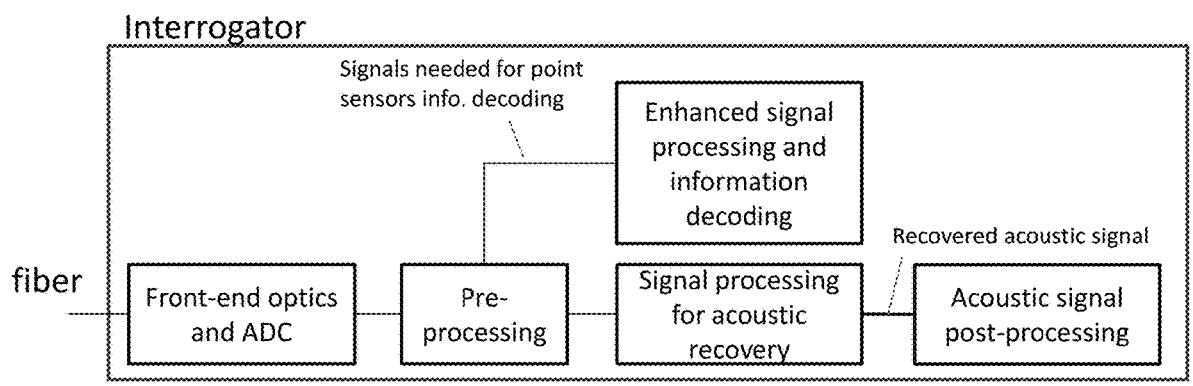
FIG. 7 is a schematic diagram of an illustrative configuration showing an interrogator passing intermediate signal (s) to demodulator/decoder according to aspects of the present disclosure.

In still another illustrative embodiment, the interrogator passes intermediate signals to the demodulator/decoder, so that the demodulator/decoder can choose to resample the data and align it for maximum SNR. FIG. 7 is a schematic diagram of an illustrative configuration showing an interrogator passing intermediate signal(s) to demodulator/decoder according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. An improved optical fiber sensing system comprising:
a length of optical fiber;
one or more point sensor elements positioned proximate to the optical fiber, said point sensor elements including
a sensor that senses an environmental condition and produces a signal indicative of that sensing;
a modulator that modulates the indicative signal onto an acoustic signal;
one or more vibration generators mechanically coupled to the optical fiber, said vibration generators generating mechanical vibrations and applying same to the optical fiber in response to the acoustic signal; and
a fiber sensor interrogator in optical communication with the optical fiber, wherein said interrogator applies interrogation signals to the optical fiber and receives reflected/backscattered signals and generates data indicative of those received signals.

2. The improved optical fiber sensing system according to claim 1 wherein the one or more vibration generators are physically spaced apart from one another.

3. The improved optical fiber sensing system according to claim 1 wherein the one or more vibration generators are insulated from the environmental condition(s).

4. The improved optical fiber sensing system according to claim 1 wherein the interrogator employs Rayleigh backscattering techniques to generate the data indicative of the received signals.

5. The improved optical fiber sensing system according to claim 1 wherein the interrogator generates the data indicative of the received signals by comparing amplitude change(s) of the received signals.

6. The improved optical fiber sensing system according to claim 1 wherein the interrogator receives, in addition to the backscattered signals, an output signal from the modulator and demodulates that modulated output signal.

7. The improved optical fiber sensing system according to claim 1 wherein the modulator modulates using spread spectrum coding for enhanced interference tolerance.

8. The improved optical fiber sensing system according to claim 1 having two or more vibration generators, wherein the two or more vibration generators are not mechanically isolated from one another and orthogonal code(s) are employed to differentiate the two or more vibration generators from one another.

9. The improved optical fiber sensing system according to claim 1 wherein at least one of the one or more vibration generators is an acoustic speaker.

10. The improved optical fiber sensing system according to claim 1 wherein at least one of the one or more vibration generators is a fiber stretcher.

* * * * *